United States Patent [19]

Narita et al.

[11] Patent Number: 4,679,861
[45] Date of Patent: Jul. 14, 1987

[54] WHEEL COVER MOUNTING

[76] Inventors: Yasuhide Narita, 4-16, Kitauchi-cho, Minami-ku, Nagoya-shi, Aichi-ken; Noboru Shirai, 104, Niho, Miya-cho, Gamagori-shi, Aichi-ken; Chihaya Kohro, Kopo Sugiura 105, 2-31, Takayashiro, Meito-ku, Nagoya-shi, Aichi-ken; Masami Hosono, 2-53, Kounomi-cho, Nishi-ku, Nagoya-shi, Aichi-ken, all of Japan

[21] Appl. No.: 775,312

[22] Filed: Sep. 12, 1985

[30] Foreign Application Priority Data

Sep. 12, 1984 [JP] Japan .............................. 59-138203[U]

[51] Int. Cl.⁴ .............................. B60B 7/00; B60B 7/02
[52] U.S. Cl. .............................. 301/37 P; 301/37 CD
[58] Field of Search .................. 301/37 R, 37 P, 37 C, 301/37 CD

[56] References Cited

U.S. PATENT DOCUMENTS

| 2,827,332 | 3/1958 | Chamberlin | 301/37 CD |
| 4,220,373 | 9/1980 | Spisak | 301/37 P |
| 4,348,061 | 9/1982 | Bowling | 301/37 R |

FOREIGN PATENT DOCUMENTS

| 1213998 | 4/1960 | France | 301/37 CD |
| 2481197 | 10/1981 | France | 301/37 P |
| 2064444 | 6/1981 | United Kingdom | 301/37 P |
| 2074104 | 10/1981 | United Kingdom | 301/37 P |

Primary Examiner—David A. Scherbel
Attorney, Agent, or Firm—Birch, Stewart, Kolasch & Birch

[57] ABSTRACT

A wheel cover mounting which comprises a wheel cover having its back face formed with a plurality of receptacles positioned adjacent the periphery thereof, and a resilient retaining member for each receptacle inserted at one end thereof into the respective receptacle in a direction axially of the wheel. The other end of the resilient retaining member protrudes outwards from the receptacle and is adapted to be press-fitted into a space which is defined between a lateral wall of a wheel disc lying generally axially of the wheel and a lateral wall of a wheel rim lying generally axially of the wheel for detachably fitting the wheel cover to the wheel. The resilient retaining member is constituted by a metallic leaf spring and the outwardly protruding end has a pair of upturned spring catches extending in the opposite directions away from each other so as to represent a generally W-shaped configuration. One of the spring catches is adapted to resiliently engage the lateral wall of the wheel disc whereas the other of the spring catches is adapted to be inserted into and resiliently engage a hump area formed in the lateral wall of the wheel rim.

3 Claims, 7 Drawing Figures

WHEEL COVER MOUNTING

BACKGROUND OF THE INVENTION

The present invention generally relates to an automobile wheel cover or hubcap and, more particularly, to a mounting for the detachable mounting of a wheel cover or hubcap, made of synthetic resin, to a wheel.

As is well known to those skilled in the art as well as automobile owners, the automobile wheels generally have wheel covers detachably attached thereto for aesthetic purpose. An example of the prior art wheel cover mountings is shown in FIG. 7 of the accompanying drawings in fragmentary sectional view, reference to which will now be made for the detailed discussion of the problem underlying the present invention.

As shown in FIG. 7, the back face of a wheel cover 20 is formed with a plurality of receptacles 20a located adjacent the periphery thereof, each of said receptacles 20a having front and bottom walls 20b and 20d and a catch opening 20c defined in the front wall 20b. For each receptacle 20a, a generally C-shaped leaf spring 22 having resiliently deformable fitting and anchoring ends 22a and 22b is carried by the wheel cover 20 with the fitting end 22a inserted in the respective receptacle 20a to resiliently partially protrude into the catch opening 20c and with the anchoring end 22b situated outwardly of the respective receptacle 20a for engagement in a hump region 21a of a wheel rim 21.

The wheel cover 20 carrying the leaf springs 22 is fitted to the respective wheel with the anchoring ends 22b resiliently received in the hump region 21a of the wheel rim 21, applying respective outwardly acting resilient forces to the wheel rim 21 thereby to retain the wheel cover 20 in position relative to the wheel. In this prior art wheel cover mounting, a reactive force of the anchoring end 22b of each leaf spring 22 relative to the hump region 21a is received and supported by the bottom wall 20d of the associated receptacle 20a. Accordingly, it has often been observed that, when the bottom wall 20d is softened under the influence of heat generated upon the braking of the wheels, the resilient force that is being applied from the anchoring end 22b to the wheel rim 21 for retaining the hubcap in position relative to the wheel is lessened.

SUMMARY OF THE INVENTION

The present invention has accordingly been devised with a view to substantially eliminating the disadvantages and inconveniences inherent in the prior art wheel cover mounting and has for its object to provide an improved wheel cover mounting wherein the reactive force of the leaf spring carried by the wheel cover will not be substantially transmitted to the wheel cover, but is received by the leaf spring itself.

Another object of the present invention is to provide an improved wheel cover mounting of the type referred to above, which is effective to firmly retain the wheel cover in position relative to the wheel, but permits an easy and quick removal of the wheel cover from the wheel, should the necessity arise during, for example, the replacement of the wheel tire or the repair of the related brake assembly.

To this end, the present invention is directed to the wheel cover mounting comprising a wheel cover having its back face formed with a plurality of receptacles positioned adjacent the periphery thereof, and a resilient retaining member for each receptacle inserted at one end thereof into the respective receptacle in a direction axially of the wheel. The other end of the resilient retaining member protrudes outwards from the receptacle and is adapted to be press-fitted into a space defined between a lateral wall of a wheel disc, which lies generally axially of the wheel, and a lateral wall of a wheel rim which also lies generally axially of the wheel, for removably securing the wheel cover to the wheel.

In accordance with the present invention, the resilient retaining member is constituted by a metallic leaf spring, and the outwardly protruding end thereof has a pair of upturned spring catches extending in the opposite directions away from each other so as to represent a generally W-shaped configuration. One of the spring catches is adapted to resiliently engage the lateral wall of the disc whereas the other of the spring catches is adapted to be inserted in and resiliently engage a hump region formed in the lateral wall of the wheel rim.

With the wheel cover mounting according to the present invention, the reactive force acting on and received by the first-mentioned spring catch as a result of the resilient engagement thereof against the lateral wall of the wheel disc an be counterbalanced by a reactive force acting on and received by the last-mentioned spring catch as a result of the resilient engagement thereof against the hump region of the wheel rim, and therefore, the reactive force is substantially transmitted from the wheel to the respective receptacle of the wheel cover. This brings about such advantages that the wheel cover made of synthetic resin can be thin-walled with the minimized number of reinforcement ribs employed and that the wheel cover can therefore be manufactured lightweight. Moreover, even though the receptacle integral with the wheel cover is softened under the influence of heat as is the case with the prior art wheel cover, the retaining force of the resilient retaining member acting between the wheel rim and the wheel disc to retain the wheel cover in position relative to the wheel cover is firmly retained in position relative to the wheel.

BRIEF DESCRIPTION OF THE DRAWINGS

These and other objects and features of the present invention will become clear from the following description taken in conjunction with a preferred embodiment with reference to the accompanying drawings, in which.

DETAILED DESCRIPTION OF THE EMBODIMENT

Figure 1:
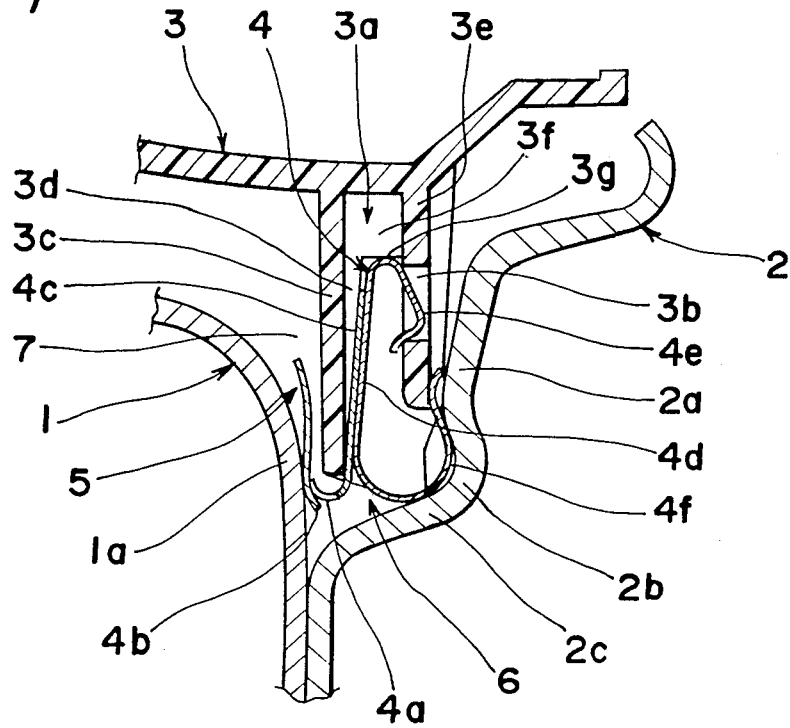
FIG. 1 is a fragmentary sectional view of an essential portion of a wheel cover mounting according to the present invention.

Referring to FIGS. 1 to 5, a wheel cover mounting according to the present invention is for detachably attaching a wheel cover 3, made of synthetic resin, to a wheel comprised of a wheel disc 1 and a wheel rim 2, by means of a plurality of resilient retaining members 4.

The wheel cover 3 has its back face formed integrally with a plurality of receptacles 3a located adjacent the periphery thereof and protruding axially inwardly, each of said receptacles 3a having a respective resilient retaining member 4 inserted thereinto.

Figure 2:
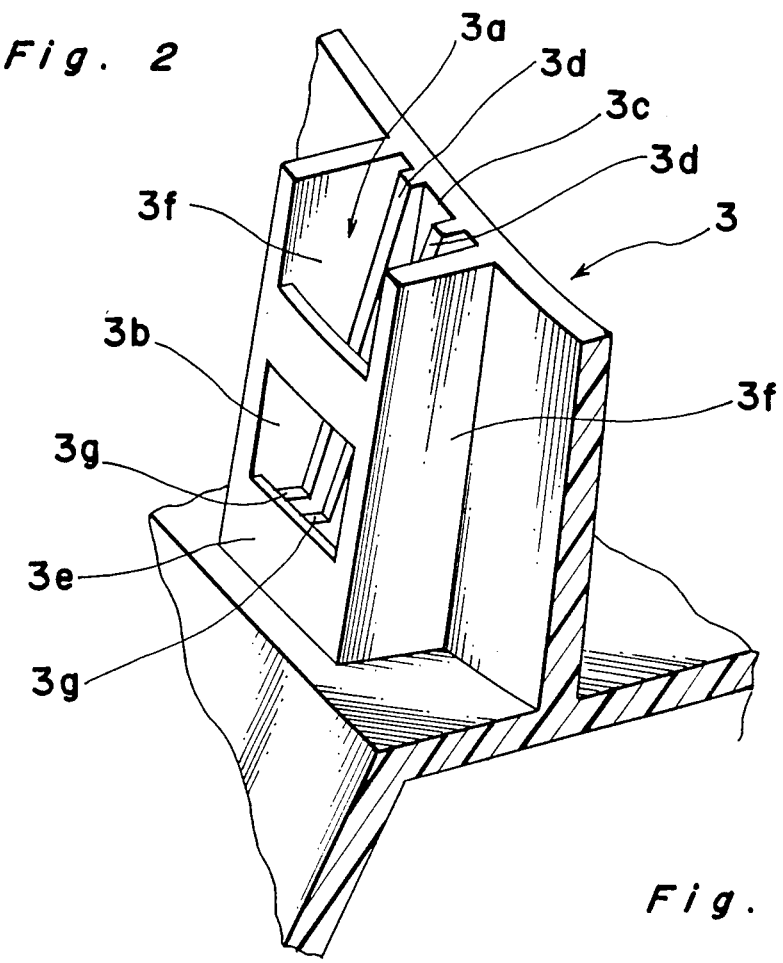
FIG. 2 is a perspective view of a portion of the wheel cover showing the details of one receptacle.

As best shown in FIG. 2, each receptacle 3a integral with the wheel cover 3 is constituted by a bottom wall 3c, a pair of side walls generally identified by 3f, and a front wall 3e and has one end opened for the receipt of the respective resilient retaining member 4 therethrough in a direction generally parallel to a wheel axis. The front wall 3e has a catch opening 3b defined therein whereas the bottom wall 3c has a pair of parallel ribs 3d each being so tapered as to rise from the open end of the associated receptacle 3a to a portion of the front wall 3e adjacent the catch opening 3b and as to be set up at 3g to the front wall 3e. The pair of side walls 3f are adapted to prevent the wheel cover 3 from being moved axially inwardly, with respective ends of the side walls 3f adjacent the open end of the associated receptacle 3a held in abutment with a bottom area 2c of the wheel rim 2.

Figure 3:
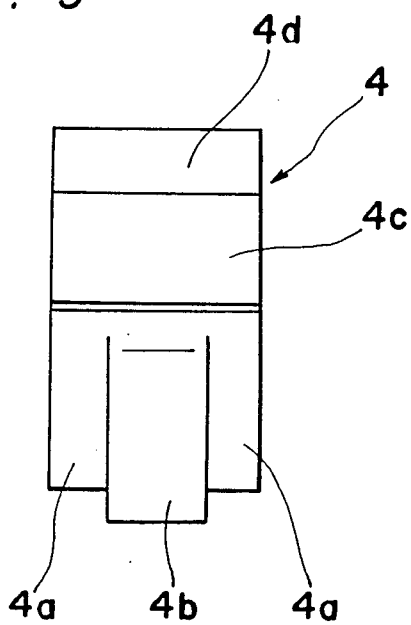
FIG. 3 is a left-hand side view of a resilient retaining member used in the wheel cover mounting of the present invention.
Figure 4:
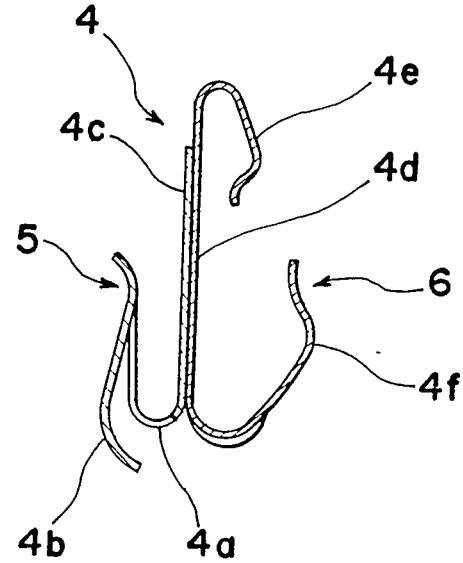
FIG. 4 is a front sectional view of the resilient retaining member.
Figure 5:
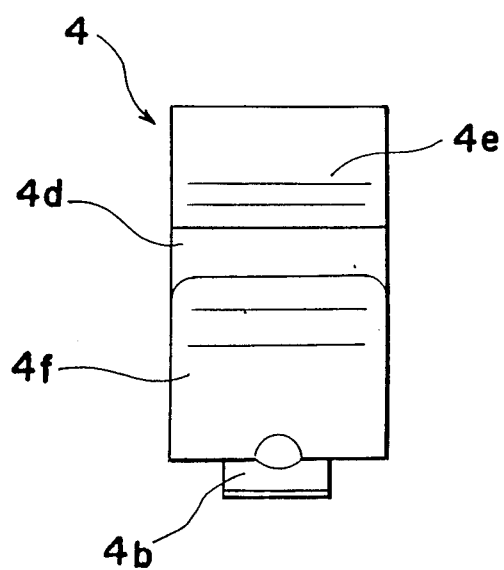
FIG. 5 is a right-hand side view of the resilient retaining member.

The resilient retaining member 4 for each receptacle 3a is made of a band of metal having a resilient property and, as best shown in FIGS. 3 to 5, includes a first retaining member 5 for engagement under pressure with the wheel disc 1 and a second retaining member 6 for engagement under pressure with the wheel rim 2.

The first retaining member 5 is of a generally elongated configuration having one end portion utilized as a flat body 4c and the other end portion turned backwardly so as to provide an upturned spring catch 4a, making the first retaining member 5 as a whole represent a generally J-shaped configuration. The upturned spring catch 4a has its substantially central area slit by the use of a known press to provide a resilient tongue 4b resiliently raised from the body of the tongue 4a in a direction outwardly away from the flat body 4c as best shown in FIGS. 3 and 4. When in use, the resilient tongue 4b so formed in the spring catch 4a resiliently engages a lateral wall 1a of the wheel disc 1 extending axially of the wheel.

On the other hand, as best shown in FIGS. 4 and 5, the second retaining member 6 is of a generally elongated configuration having its opposite end portions turned backwards so as to provide a fitting tongue 4e and a spring catch 4f confronting with each other with the second retaining member 6 as a whole consequently representing a general shape of a figure "C", a substantially intermediate portion of which is utilized as a flat body 4d. When in use, the spring catch 4f so formed is resiliently inserted in and pressed against a hump area 2b formed in a lateral wall 2a of the wheel rim 2 along a direction axially of the wheel.

The first and second retaining members 5 and 6 are, in the illustrated embodiment, rigidly connected together with their respective flat bodies 4c and 4d fusion-bonded with each other so that the spring catches 4a and 4f of the first and second retaining members 5 and 6 can be positioned on respective sides of the fusion-bonded flat bodies 4c and 4d. The fitting tongue 4e of the second retaining member 6 has a portion adjacent the free end thereof so bent and so shaped as to protrude into the catch opening 3b in the front wall 3e of the associated receptacle 3a to retain the resilient retaining member 4 in position within the receptacle 3a when such resilient retaining member 4 is mounted on the wheel cover 3 with the fitting tongue 4e inserted into the receptacle 3a.

When the resilient retaining member 4 is mounted on the wheel cover 3, the flat body 4c of the first retaining member 5 rests on the parallel ribs 3d formed in the bottom wall 3c of the receptacle 3a while the flat body 4d of the second retaining member 6 is held in abutment with the set-up areas 3g of the respective parallel ribs 3d, and at the same time, that portion of the fitting tongue 4e adjacent the free end thereof is engaged into the catch opening 3b in the front wall 3e by the effect of the resiliency of the fitting tongue 4e. It is, however, to be noted that the fitting tongue 4e is, as it is inserted into the receptacle 30a with the flat body 4c of the member 5 sliding along the ribs 3d, resiliently deformed close towards the flat body 4d against the resiliency thereof in sliding contact with the front wall 3d and at the time of complete insertion with the flat body 4d abutting against the set-up areas 3g of the ribs 3d, the fitting tongue 4e once inwardly deformed is allowed to expand outwards away from the flat body 4d by the effect of its own resiliency with that portion of said tongue 4e consequently engaged in the catch opening 3b in the front wall 3e. Therefore, unless an external press is applied to that portion of the fitting tongue 4e through the catch opening 3b in the front wall 3e, the resilient retaining member 4 will not separate outwardly from the receptacle 30a.

The wheel cover 3 having the resilient retaining members 4 received in the respective receptacles 30a is fitted to the wheel in such a way as to permit the spring catches 4a and 4f of each resilient retaining member 4 to be press-fitted into a space 7 defined between the lateral wall 2a of the wheel rim 2 and the lateral wall 1a of the wheel disc 1 as best shown in FIG. 1. When the spring catches 4a and 4f of each resilient retaining member 4 are so inserted into the space 7, the resilient tongue 4b and the spring 4f expand outwardly with respect to each other by the effect of their own resiliency thereby firmly contacting the lateral walls 1a and 2a, respectively, and therefore, the wheel cover 3 can be retained in position as fitted to the wheel. At this time, the spring catch 4f is resiliently inserted in and engaged with the hump area 2b of the wheel rim 2 by the effect of its own resiliency while the respective ends of the side walls 3f of each receptacle 3a adjacent the open end thereof are held in abutment with the bottom area 2c of the wheel rim 2 to position the wheel cover 3 relative to the wheel.

The removal or detachment of the wheel cover 3 from the wheel can be accomplished merely by pulling the wheel cover 3 axially outwardly of the wheel axis to allow the spring catches 4a and 4f to escape out of the space 7.

Thus, the reactive force acting on and received by the spring catch 4a in view of the fact that the resilient tongue 4b raised from the spring catch 4a is resiliently held in abutment against the lateral wall 1a of the wheel disc 1 acts in a direction opposite to, and can therefore be counterbalanced by a reactive force acting on and received by the spring catch 4f in view of the fact that the spring catch 4f is resiliently held in abutment against the hump area 2b of the wheel rim 2. Therefore, no reactive force is substantially transmitted from both the lateral wall 1a of the wheel disc 1 and the hump area 2b of the wheel rim 2. This makes it possible to manufacture the wheel cover of thin-walled, lightweight structure with the employment of reinforcement ribs in a minimized number. Moreover, even though the bottom wall 3c of the receptacle 3a is softened by the heat evolved upon the braking, the balance between the reactive forces produced on the spring catches 4a and 4f, respectively, permits the wheel cover 3 to be firmly retained in position relative to the wheel with no substantial possibility of the wheel cover detaching from the wheel.

The presence of the resilient tongue 4b in the spring catch 4a upturned from the flat body 4c makes it possible that the resilient tongue 4b is resiliently engaged deep interiorly against the lateral wall 1a of the wheel disc with a minimized possibility of being disengaged therefrom, thereby permitting the wheel cover 3 to be firmly retained in position relative to the wheel.

It is incidentally pointed out that the wheel discs may have varying size, in which case the catch spring 4a may be deformed in a different degree. However, since the formation of the resilient tongue 4b has resulted not only in the reduction of the spring constant, but also in the capability of deforming in a high degree, the change in force relative to change in size of the wheel discs can be minimized.

Where the shape of the wheel disc 1 varies depending on the type of wheel, the wheel cover mounting according to the present invention can be effectively utilized merely by changing the shape of only the first retaining member 5 or changing the position at which welding is performed between the flat bodies 4c and 4d of the first and second retaining members 5 and 6.

Figure 6:
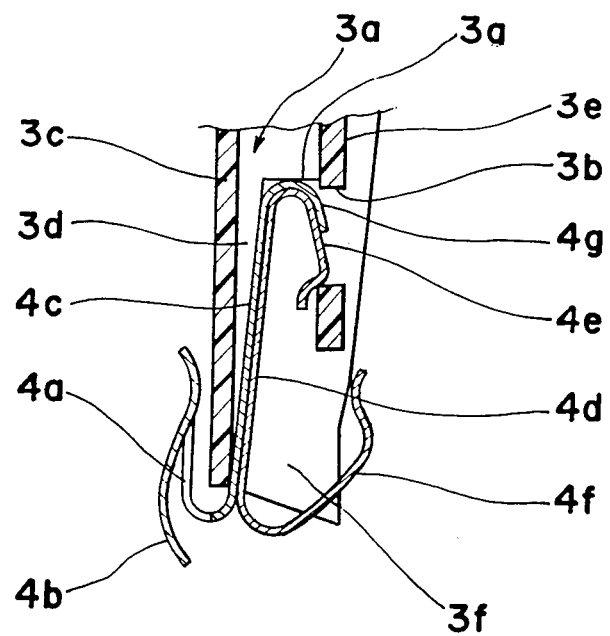
FIG. 6 is a view similar to FIG. 1, showing a modified form of the resilient retaining member.
Figure 7:
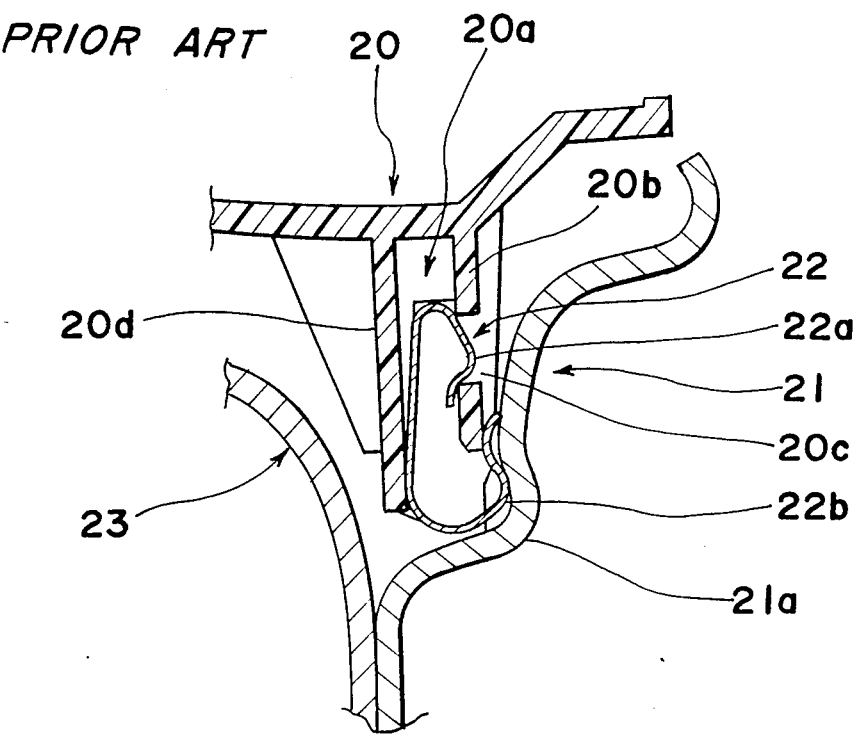
FIG. 7 is a fragmentary sectional view of an essential portion of the prior art wheel cover mounting.

Although the present invention has been described in connection with the preferred embodiment thereof with reference to the accompanying drawings, it is to be noted that various changes and modifications are apparent to those skilled in the art without departing from the scope of the present invention as defined by the appended claims. By way of example, the first and second retaining members 5 and 6 may not be welded together such as in the foregoing embodiment and, in such case, as shown in FIG. 6, the first retaining member 5 has to be formed with an anchoring finger 4g on one side of the flat body 4c opposite to the catch spring 4a so as to bend to follow the curvature of the fitting tongue 4e for the receipt of the fitting tongue 4e therein. Each of the receptacles 3a may not be limited to that shown and described, but may be of any suitable structure if and only if the respective retaining member 4 having the first and second retaining members 5 and 6 can be retained in position to the wheel cover 3. When the resilient retaining member 4 of the construction shown in FIG. 6 is desired to be mounted on the wheel cover 3 prior to the latter being fitted to the wheel, the first retaining member 5 has to be first inserted into the receptacle 30a with the curved anchoring finger 4g received therein and the second retaining member 6 is to be subsequently inserted into the same receptacle 30a with the fitting tongue 4e received inwardly in the curved anchoring finger 4g and with the flat body 4d held flat against the flat body 4c.

Also, the first and second retaining members 5 and 6 may be manufactured in a unitary structure.

Furthermore, although reference has been made to the catch opening 3b formed in the receptacle 30a, it may be employed in the form of a recess.

Accordingly, such changes and modifications are to be understood as included within the scope of the present invention.

What is claimed is:

1. In a wheel cover mounting which comprises a wheel cover having its back face formed with a plurality of receptacles positioned adjacent the periphery thereof, and a resilient retaining member for each receptacle inserted at one end thereof into the respective receptacle in a direction axially of the wheel, the other end of said resilient retaining member protruding outwards from the receptacle and being adapted to be press-fitted into a space which is defined between a lateral wall of a wheel disc lying generally axially of the wheel and a lateral wall of a wheel rim lying generally axially of the wheel for detachably fitting the wheel cover to the wheel, the improvement wherein said resilient retaining member is constituted by a metallic leaf spring and said outwardly protruding end has a pair of curved upturned spring catches extending in the opposite directions away from each other so as to represent a generally W-shaped configuration, one of said spring catches being adapted to resiliently engage the lateral wall of the wheel disc whereas the other of the spring catches is adapted to be inserted into and resiliently engage a hump area formed in the lateral wall of the wheel rim.

2. A wheel cover mounting as claimed in claim 1, wherein said one of the upturned spring catches has a resilient tongue formed therein so as to protrude outwards leaving an opening in a portion of the spring catch.

3. A wheel cover mounting as claimed in claim 1, wherein said one of the upturned spring catches forming said generally W-shaped configuration has a resilient tongue formed therein and said resilient tongue being attached at one end to one end of said generally W-shaped configuration.

* * * * *